July 8, 1930. P. R. MORRISON 1,770,279
VEHICLE FRAME AND DETACHABLE POWER UNIT APPARATUS
Filed April 17, 1928 2 Sheets-Sheet 1
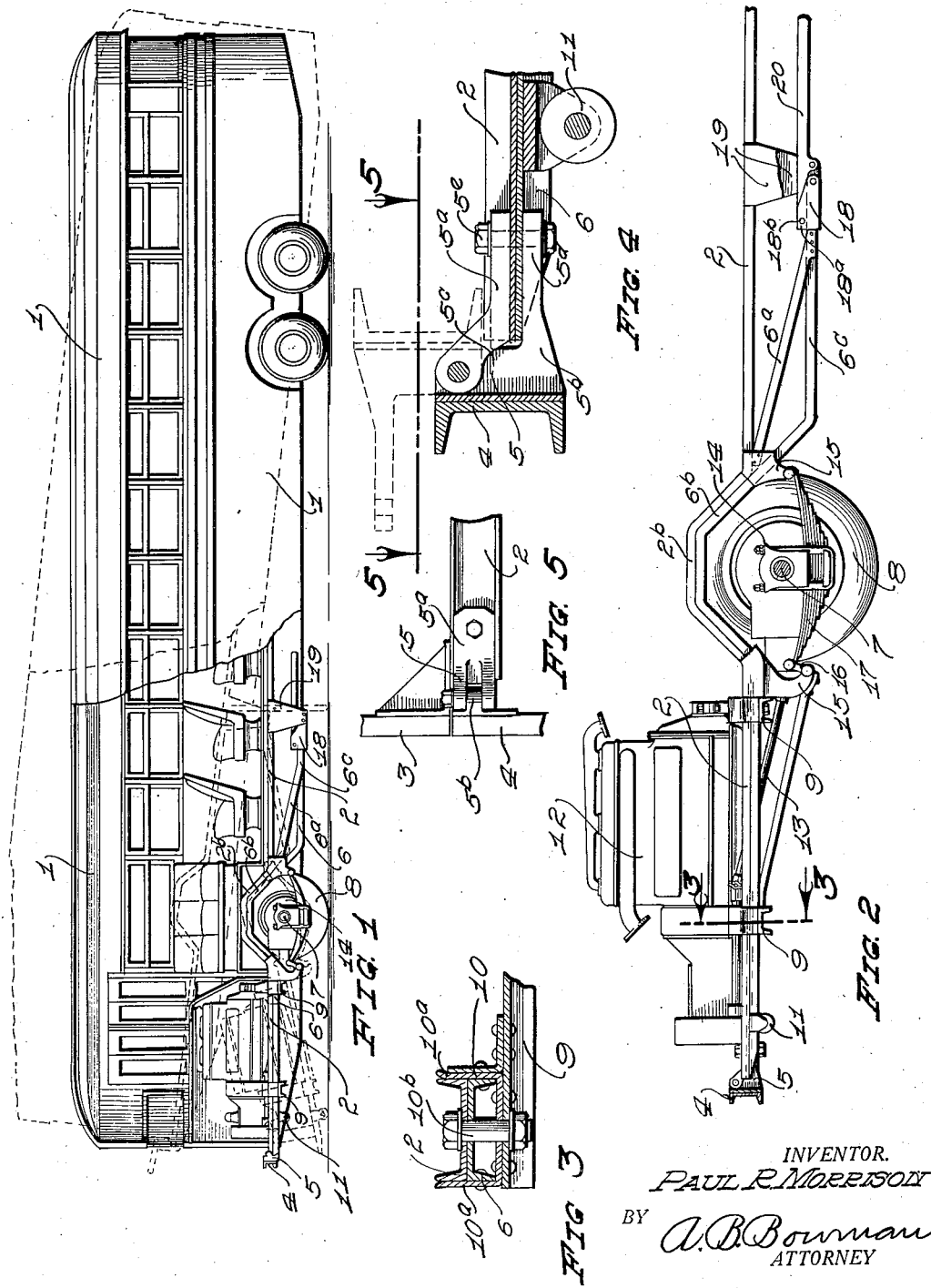
INVENTOR.
PAUL R. MORRISON
BY A. B. Bowman
ATTORNEY July 8, 1930.  P. R. MORRISON  1,770,279
VEHICLE FRAME AND DETACHABLE POWER UNIT APPARATUS
Filed April 17, 1928   2 Sheets-Sheet 2

INVENTOR.
PAUL R. MORRISON
BY A. B. Bowman
ATTORNEY

Patented July 8, 1930

1,770,279

UNITED STATES PATENT OFFICE

PAUL R. MORRISON, OF SAN DIEGO, CALIFORNIA, ASSIGNOR TO MODERN MACHINE AND AUTO BODY CO., OF SAN DIEGO, CALIFORNIA, A CORPORATION OF CALIFORNIA

VEHICLE FRAME AND DETACHABLE POWER-UNIT APPARATUS

Application filed April 17, 1928. Serial No. 270,623.

My invention relates to a detachable power unit and vehicle frame apparatus and the objects of my invention are: first, to provide an apparatus of this class in which the drive wheels, power unit, and connecting mechanism form a single readily detachable unit of a vehicle; second, to provide an apparatus of this class in which the drive wheels serve as a fulcrum of a frame of which the one extended portion supports the power unit while the other end portion is pivotally connected to the vehicle, the frame thereby forming a lever which raises the vehicle clear of the power unit as the power unit is lowered; third, to provide an apparatus of this class in which the one end of the vehicle is automatically raised to an elevated position and held there by the act of removing the power unit; fourth, to provide an apparatus of this class which is especially adapted for large vehicles such as trucks, stages or buses; fifth, to provide an apparatus of this class in which the power unit when detached from the vehicle may be readily moved from under said vehicle, said power unit being supported by the drive wheels at the one end and rollers at the other end thereof; sixth, to provide an apparatus of this class in which the weight of the power unit supplies much of the force for lifting the one end of the vehicle in order to remove said power unit from under said vehicle; seventh, to provide an apparatus of this class in which the power unit supporting frame is interlocked with the vehicle chassis frame in such a way that a minimum number of bolts or other securing means are needed, thus facilitating the rapid separation of the power unit from the vehicle for removing and ninth, to provide a device of this class which is extremely simple of construction proportionate to its functions, reliable, safe, efficient in its action and which will not readily deteriorate or get out of order.

Figure 6:
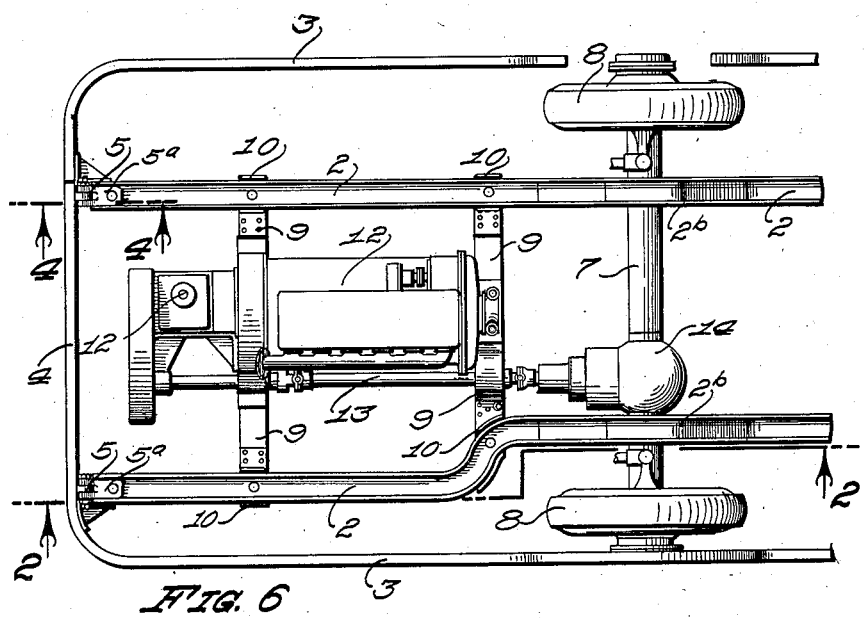
Figures 7, 8:
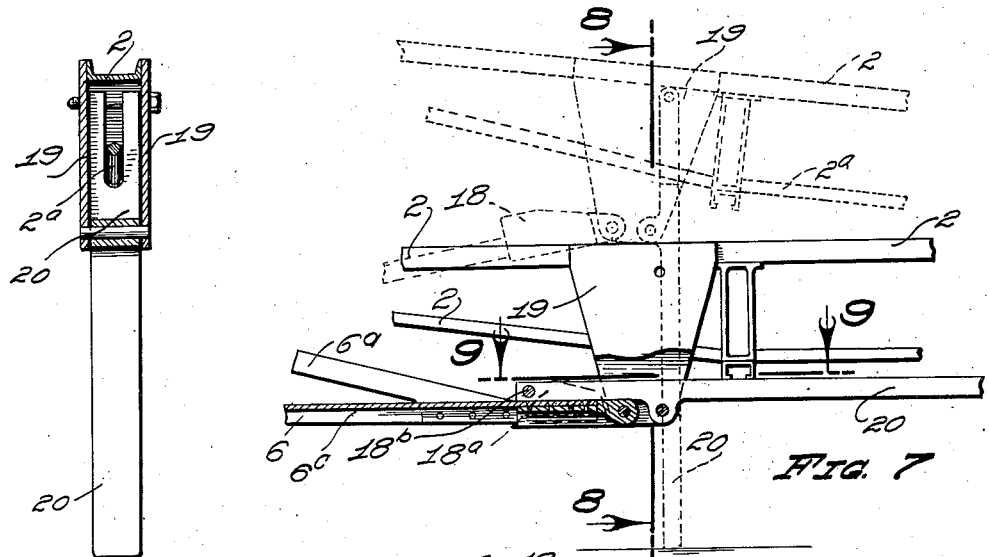
Figure 9:
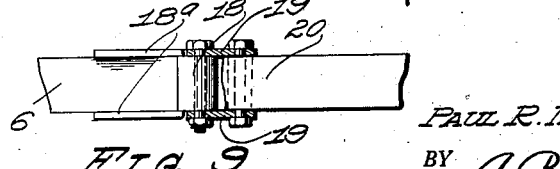

With these and other objects in view as will appear hereinafter, my invention consists of certain novel features of construction, combination and arrangement of parts and portions as will be hereinafter described in detail and particularly set forth in the appended claims reference being had to the accompanying drawings and to the characters of reference thereon which form a part of this application in which:

Figure 1 is a side elevational view of a vehicle embodying my apparatus with the forward portion thereof broken away and in section and with parts and portions removed to facilitate the illustration; Fig. 2 is a slightly enlarged sectional view of the power unit and chassis frame through the line 2—2 of Fig. 6; Fig. 3 is an enlarged fragmentary sectional view through 3—3 of Fig. 2 with parts and portions in elevation to facilitate the illustration; Fig. 4 is an enlarged fragmentary sectional view through 4—4 of Fig. 6 with parts and portions shown in elevation to facilitate the illustration; Fig. 5 is a slightly reduced fragmentary plan view from the line 5—5 of Fig. 4; Fig. 6 is a fragmentary top or plan view of the power unit with parts and portions broken away to facilitate the illustration; Fig. 7 is an enlarged fragmentary sectional view showing the end of the power unit frame and the vehicle prop member which comes into play when the power unit is being removed; Fig. 8 is a sectional view thereof through 8—8 of Fig. 7 showing the chassis frame prop in supporting position; and Fig 9 is a fragmentary sectional view through 9—9 of Fig. 7.

Similar characters of reference refer to similar parts and portions throughout the several views of the drawings.

The body 1, chassis frame 2, side guard members 3, front guard member 4, hinge members 5, power unit frame 6, drive shaft housing 7, drive wheels 8, engine support 9, guide members 10, rollers 11, engine 12, propeller shaft 13, differential housing 14, spring perches 15, spring shackle 16, springs 17, reinforcing members 18, plate members 19, chassis frame props 20, constitute the principal parts and portions of my detachable power unit and vehicle frame apparatus.

The vehicle body 1 which is shown is a bus but any other type of body may be used. The vehicle chassis frame 2 consists of two longitudinally extending members with suitable cross bracing, not shown, and suitable longitudinal bracings 2ª which reinforce the chassis frame between the front and rear wheels of the vehicle. The side margins of the vehicle are reinforced by side guard members 3 which are curved at their forward ends and secured to the outer side ends of the chassis frame 2 as shown best in Fig. 6 of the drawings. The two longitudinal members of the chassis frame are connected at their forward ends to a front guard member 4 by means of hinge members 5.

The power unit which includes the wheels, axle therefor, engine and connecting mechanism is supported by a power unit frame 6. The power unit frame 6 is secured to the under surface of the forward portion of the chassis frame. The chassis frame is offset at $2^b$ in order to clear the drive axle housing 7 which is connected to the drive wheels 8. Offsets $6^b$ are provided in the power unit frame 6 which coincide with the offsets $2^b$ in the chassis frame, thus tending to interlock said chassis frame and power unit frame against lateral movement when in alined position.

Engine supports 9 are provided which support the forward and rear ends of the engine 12, as shown best in Figs. 2 and 6 of the drawings. Each end of each engine support is provided with a guide member 10 which is substantially U-shaped in cross section, the cross portion of which fits under the power unit frame and the legs $10^a$ thereof are secured to the sides of the power unit frame and extend upwardly and adjacent to the sides of the chassis frame 2, as shown best in Fig. 3 of the drawings. The guide members 10 hold the chassis frame and power unit frame from relative side movement and also serve to center the power unit frame relative to the chassis frame when positioning the power unit in place. Bolts $10^b$ extend through the guide members 10 and hold the chassis frame and power unit frame in rigid relation.

The hinge members 5 also serve as a further means of holding the chassis frame and power unit frame together, as shown best in Fig. 4 of the drawings. The one portion $5^a$ of each hinge is secured to an end of the chassis frame. The other portion $5^b$, which is substantially L-shaped, is secured to the front guard member 4 by the upright leg $5^c$. The longer or horizontal legs $5^d$ extend under the end of the power unit frame 6 underneath the hinge portion $5^a$. The extremities of the hinge 5 serve as a clamp which, when held by means of the bolts $5^e$, secure the ends of the chassis frame and power unit frame together.

Immediately behind each hinge member 5 and mounted on the under side of the power unit frame 6 is a roller member 11. The roller 11 is adapted to support the forward end of the power unit when it is removed from the vehicle, as shown by the dotted lines in Fig. 1 of the drawings.

The engine 12 which is secured on the engine supports 9 is connected through a propeller shaft 13 to the differential housing 14 which in turn is connected to the drive axle housing 7. It is preferred to mount the transmission portion of the engine at the forward side thereof in order to use a drive shaft of sufficient length to permit movement of the drive axle and yet keep the power unit in as small a space as possible.

The rear extended portion $6^c$ of the power unit frame 6 is reinforced by a brace member $6^a$ secured between the rear spring perch and the extremity of said extended end. The rear ends of the power unit frame 6 are provided with a reinforcing member 18. The reinforcing member 18, one for each side of the power unit frame 6, is pivotally secured between the lower portions of plate members 19 which are secured to either side of the chassis frame 2 and extends downwardly therefrom.

A pair of spring perches 15 are mounted at the forward and rear terminus of the offset portion $6^b$. A shackle 16 is connected to one of the perches, a conventional spring 17 is mounted between the shackel 16 and the other perch 15. The axle housing 7 which carries the drive axle is secured to the spring 17 in any suitable manner.

A chassis frame prop 20 is also pivoted near its one end between the lower portion of the plate members 19. When the power unit is in place the chassis frame prop 20 is held in a horizontal position by means of a pin $18^b$ between upwardly extending portions $18^a$ of the reinforcing member 18.

If desired the portion of the chassis frame and power unit frame opposite the one side of the engine may be offset to provide space for the steering apparatus and other mechanism, not shown.

In removing the power unit from the vehicle, the bolts $5^e$ are removed from the hinge 5 and the hinge moved to the position shown by the dotted lines in Fig. 4 of the drawings. The other bolts $10^b$ which extend through the junction of the engine supports with the chassis frame and power unit frame are removed. The power unit frame may be then pivoted about the axle of the drive wheels until the rollers 11 are resting on the floor, as shown by the dotted lines in Fig. 1 of the drawings.

As the engine is lowered the opposite extended ends of the power unit frame are raised causing the chassis props, after the pins $18^b$ have been removed, to assume a vertical position, as shown by the dotted lines in Figs. 1 and 7 of the drawings. When the rollers 11 reach the floor the props 20 may be secured in their vertical position and the reinforcing member 18 disconnected from the plate members 19. The vehicle body and chassis frame is raised by the downward movement of the engine until, when in the position shown by the dotted lines in Fig. 1 of the drawings, the power unit may be wheeled out from under the vehicle.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention what I claim as new and desire to secure by Letters Patent is:

1. In a vehicle, a chassis frame, a second frame mounted under said chassis frame and contiguous thereto, means for pivotally connecting said second frame in a horizontal axis and at its one end to said chassis frame, a driving wheel mechanism supporting said second frame intermediate the ends thereof, and a power mechanism mounted between the other end of said second frame and said driving wheel mechanism.

2. In a vehicle, a chassis frame, a second frame mounted under said chassis frame and contiguous thereto, means for pivotally connecting said second frame in a horizontal axis and at its one end to said chassis frame, a driving wheel mechanism supporting said second frame intermediate the ends thereof, a power mechanism mounted between the other end of said second frame and said driving wheel mechanism, and means for detachably securing said second frame relative to said chassis frame.

3. In a vehicle, a chassis frame, a second frame mounted under said chassis frame and contiguous thereto, a driving wheel mechanism mounted intermediate the ends of said second frame, a power mechanism mounted on the one extended portion of said second frame in operative position to said drive wheel mechanism, and means for pivoting said second frame about the drive wheels of said drive wheel mechanism and coincidentally raising said chassis frame.

4. In a vehicle, a chassis frame, a second frame mounted under said chassis frame and contiguous thereto, a driving wheel mechanism mounted intermediate the ends of said second frame, a power mechanism mounted on the one extended portion of said second frame in operative position to said drive wheel mechanism, means for pivoting said second frame about the drive wheels of said drive wheel mechanism and coincidentally raising said chassis frame and roller means for supporting the one extended end of said second frame when in its pivoted position.

5. In a vehicle, a chassis frame, a second frame mounted under said chassis frame and movable thereto, means for securing said second frame in a contiguous position to said chassis frame, a drive wheel mechanism mounted intermediate the ends of said second frame, a power mechanism mounted near the one extended end of said second frame, said second frame pivotable about the drive wheel of said drive wheel mechanism causing an elevational movement of said chassis frame with the pivotal movement of said second frame, and roller means for supporting said power mechanism when said second frame is in its pivoted position.

6. In a vehicle, a chassis frame, a second frame mounted under said chassis frame and movable thereto, means for securing said second frame in a contiguous position to said chassis frame, a drive wheel mechanism mounted intermediate the ends of said second frame, a power mechanism mounted near the one extended end of said second frame, said second frame pivotable about the drive wheel of said drive wheel mechanism causing an elevational movement of said chassis frame with the pivotal movement of said second frame, roller means for supporting said power mechanism when said second frame is in its pivoted position and automatic means operated by said second frame for securing said chassis frame in the elevated position thereof.

7. In a vehicle, a chassis frame, a second frame mounted under said chassis frame and contiguous thereto, a driving wheel mechanism mounted intermediate the ends of said second frame, a power mechanism mounted on the one extended portion of said second frame in operative position to said drive wheel mechanism, means for pivoting said second frame about the drive wheels of said drive wheel mechanism and coincidentally raising said chassis frame, roller means for supporting the one extended end of said second frame when in its pivoted position, automatic means operated by said second frame for securing said chassis frame in the raised position thereof.

8. In a vehicle, a chassis frame, a second frame mounted under said chassis frame and contiguous thereto, said second frame pivotally connected at its one end to said chassis frame, a driving wheel mechanism mounted intermediate the ends of said second frame, a power mechanism mounted between the other end of said second frame and said driving wheel mechanism, means for interlocking and securing said second frame relative to said chassis frame, said second frame pivotable about the drive wheels of said drive wheel mechanism and adapted to raise said chassis frame, automatic means operated by said second frame for securing said chassis frame in the raised position thereof.

9. In a vehicle, a chassis frame, a pair of wheels supporting the one end portion of said chassis frame, a power unit frame, a second pair of wheels supporting said power unit frame intermediate its ends, means for pivotally connecting said second frame to said first frame in a horizontal axis intermediate the axes of said first and second wheels, and means for detachably securing said frames in overlapping relation.

10. In a vehicle, a chassis frame, a pair of wheels for supporting the one end portion of said frame, a power unit frame, a pair of wheels supporting said second frame intermediate the ends thereof, said second frame positioned contiguous to the other end portion of said first frame, means for pivotally connecting the inner end of said second frame to said first frame, other means for detachably securing said frames together, a power unit supported on said second frame in such a manner as to cause said second frame to pivot around the axis of the wheels thereon on removal of said securing means and to swing said first frame above and clear of said power unit.

11. In a vehicle, a chassis frame, wheels supporting the rear portion of said frame, a power unit frame, wheels supporting said second frame and the forward portion of said first frame substantially horizontally, said second frame extending to a position intermediate the axes of said wheels, means enabling said second frame to be pivoted around the respective wheel axis with its one end raised above the horizontal position and causing the forward end of said first frame to be raised clear of the forward portion of said second frame.

12. In a vehicle, a chassis frame, wheels supporting the rear portion of said frame, a power unit frame extending contiguous with and supporting the forward portion of said chassis frame, wheels supporting said second frame intermediate the ends thereof, a power unit mounted on the one end of said second frame and adapted to cause a turning moment with respect to the axis of said latter wheels, means for transmitting said moment to said first frame for raising the forward end thereof clear of the portion of said second frame supporting said power unit.

13. In a vehicle, a body, a chassis frame supporting said body, wheels supporting the rear portion of said frame, a power unit frame extending contiguous with and supporting the forward portion of said first frame, wheels for supporting said second frame, a power unit mounted on said second frame, said power unit being so related to the axis of said wheels as to cause a turning moment relative thereto in a given direction, means for transmitting said moment to said first frame at a point intermediate said rear and front wheels, the wheels supporting the rear of said chassis frame being so positioned relative to said body as to cause a moment to be exerted relative to the axis of said wheels in a reverse direction to that transmitted to said first frame, the balance of said moments being such as to cause said power unit to be lowered and the contiguous portion of said chassis frame to be raised.

In testimony whereof, I have hereunto set my hand at San Diego, California, this 7th day of April, 1928.

PAUL R. MORRISON.